March 12, 1963

A. M. SEVERSON 3,080,886

FLUID AMPLIFIER

Filed Sept. 18, 1961

INVENTOR.
ASBJORN M. SEVERSON

BY Alfred N. Feldman

ATTORNEY 3,080,886
FLUID AMPLIFIER

Asbjorn M. Severson, Minneapolis, Minn., assignor to Minneapolis-Honeywell Regulator Company, Minneapolis, Minn., a corporation of Delaware Filed Sept. 18, 1961, Ser. No. 138,899
9 Claims. (Cl. 137—597)

The present invention is directed to a unique type of fluid amplifying device that has a plurality of fluid amplifier sections connected to a single inlet manifold, and wherein the output of the fluid amplifiers is directed into a single receiving chamber that has a plurality of outlets for selectively controlling the fluid flow.

More specifically, the present invention is directed to a fluid amplifier means that is capable of controlling the flow of a fluid in a modulating fashion or can be used to thoroughly intermix a number of flowing fluids as may be desirable in many processing or mixing processes. The present invention utilizes a fluid manifold chamber which receives one or more fluids and provides an inlet for fluid to two or more fluid amplifier sections. Each fluid amplifier section has its inlet connected to one outlet of the manifold so that fluid is supplied to the fluid amplifier sections in a normal manner. Each of the fluid amplifier sections is then provided with appropriate control ports to apply a control signal to each of the amplifier sections. The output of each amplifier section can be diverted into two independent paths. By providing two or more fluid amplifier sections with each section having two fluid flow paths, it is possible to cause the fluid from the manifold chamber to flow into an outlet chamber in a controlled fashion. The outlet chamber then has a number of outlet pipes that can be selected by the direction of flow of fluid from each of the amplifier sections so that the fluid either is carried off in one or more of the outlet pipes or is thoroughly mixed in the outlet chamber and associated oulets.

The type of fluid amplifier used for each of the sections of the amplifier control means can be selected from any one of a number of fluid amplifiers which are now common in the literature. The particular type of fluid amplifier specifically dislosed in the present application is not the only type of fluid amplifier that can be used in the operation of the present invention. The fluid amplifier could be of a type disclosed by Richard J. Reilly in an application filed November 16, 1960, and which was assigned Serial No. 69,645, now Patent 3,030,979, April 24, 1962. The type of fluid amplifier used is not directly material to the present invention and it will be appreciated, after a description of the operation, that any number of specific types of fluid amplifiers can be used. The fluid amplifiers all have a common feature in that no moving parts are used in switching the fluid in the operation of the amplifier. It is further noted that the fluid amplifier sections of the present invention can be all of the same type or may be intermixed between the various types of fluid amplifiers that may be known without changing the inventive concept.

The object of the present invention is to disclose a novel type of fluid amplifier that is capable of controlling the flow of a fluid in a manner which distributes the fluid in one or more of a plurality of outlets.

A further object of the present invention is to disclose a fluid amplifier that can be used to create turbulence of flow between the inlet and outlet to thoroughly mix one or more fluids fed into an inlet manifold or to separate inlets.

Yet another object of the present invention is to describe a fluid amplifier control device that is capable of being step controlled so that fluid can be directed into a plurality of paths from a single inlet.

Yet a further object of the present invention is to disclose a fluid modulating or mixing device that has no moving parts.

Another object of the present invention is to disclose a fluid control device that is suitable for regulating the flow of fluid in a number of outlet paths simultaneously.

These and other objects will become apparent when the present specification is considered in detail along with the present drawing, wherein—

Figures 1, 2, 3, 4, 5:
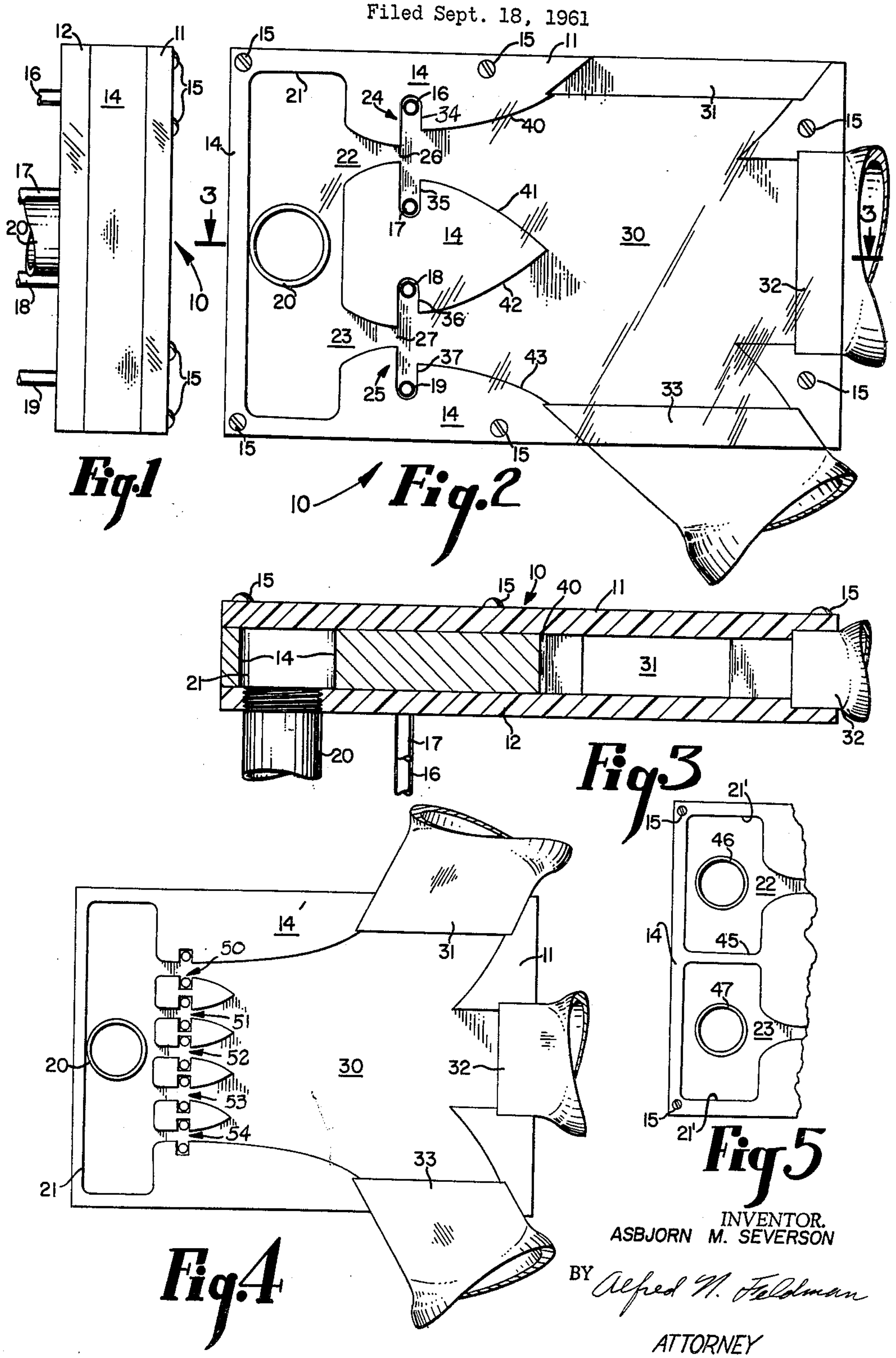
FIGURE 1 is an end view of one embodiment of the invention.
FIGURE 2 is a top view of one embodiment showing the amplifier sections and plurality of outlets.
FIGURE 3 is a cross section of FIGURE 2 along line 3—3.
FIGURE 4 is a top view in schematic of a second embodiment of the present invention.
FIGURE 5 is a modification, in reduced scale, of the inlet of FIGURE 2.

A fluid amplifier means 10 is disclosed in FIGURES 1 through 3. The fluid amplifier means 10 is made up of a pair of clear plastic plates 11 and 12 with an intermediate flow defining plate means 14. The plates 11 and 12 have been disclosed as clear plastic in order to provide a model or disclosure that can be viewed or disclosed without unnecessary cross-sectioning. It is understood that the plates 11, 12 and 14 can be made of any rigid type of material and further that these plates can be held in a laminated arrangement by any convenient means. In the present disclosure a plurality of screws 15 have been specifically shown. The plates however could be held in a fluid tight arrangement by cements, glues, or any other convenient type of clamping means. The top plate 11 is substantially flat and uniform in thickness and has no openings other than those required for the insertion of screws 15. The plate has recesses that will be described subsequently.

The bottom plate 12 has 5 openings threaded into it for the insertion of pipes 16, 17, 18, 19, and 20. Each of the pipes 16 through 20 extends through the lower plate 12 and provides a flow means for the input of the fluid to be controlled and the application of control pressures or signals to the amplifier sections of the disclosed device. The pipes 16, 17, 18, and 19 are quite small and are used to apply the control signal. The pipe 20 is of substantial diameter and is utilized to supply the main fluid flow into the fluid amplifier means 10.

At this point it should be noted that the fluid supplied to the present fluid amplifier means can be of any type. The utilization of the term fluid encompasses any gas, liquid, semisolid, or similar type of material which can be caused to flow under the application of a pressure differential. It is further noted that the term fluid refers to any mixture or combination of any of the materials that can be individually used, and as an example, the term fluid would refer to water, which was intermixed with a stream of air.

The fluid inlet 20 opens into the center plate means 14 in a section 21 that is rectangular in shape and forms a fluid manifold chamber for the receipt of any and all of the fluid from pipe 20. The manifold chamber 21 has a plurality of outlets 22 and 23 that supply the fluid from pipe 20 to two fluid amplifier sections 24 and 25. In reality each of the fluid amplifier sections 24 and 25 form individual fluid amplifiers. The fluid amplifier sections 24 and 25 each have an inlet throat 26 and 27 which directs the total fluid flow into an outlet chamber 30. The outlet chamber 30 has a plurality of individual outlet pipes 31, 32, and 33. The outlet pipes 31, 32, and 33 are set into the plate means 14 and are slightly recessed in the outer plates 11 and 12 to form fluid tight joints so that the entire fluid amplifier means is capable of carrying the fluid therein without leaking. The outlet pipes 31, 32, and 33 can be directed to any type of apparatus or tanks as the particular application of the fluid amplifier means may require. The particular device or system to which the pipes 31, 32, and 33 are directed is not material to the present invention.

Included in each of the fluid amplifier sections 24 and 25 are a pair of control ports 34, 35, 36, and 37. The pair of control ports 34 and 35 are associated with the fluid amplifier section 24, while the control ports 36 and 37 are associated with the fluid amplifier section 25. The control port 34 is supplied with a control signal from pipe 16 while the control port 35 is supplied with the control signal from pipe 17. Likewise, pipes 18 and 19 supply control signals to the ports 36 and 37. In the present type of fluid amplifier sections, the control of the fluid flowing through the amplifier sections is accomplished by creating a pressure differential across the fluid flowing through the nozzles or inlets 26 and 27. The pressure differential can be accomplished by introducing a fluid flow into one or the other of the control ports or by the application of a vacuum across the control ports. The particular type of control again is not material to the present invention. It is enough to indicate at the present time, that by applying a pressure differential between the ports 34 and 35 it is possible to switch the fluid in the amplifier section 24 between the walls 40 and 41 which are formed as part of the plate means 14. Likewise it is possible to switch the fluid flow through the fluid amplifier section 25 by varying the pressure differential between the control ports 36 and 37 so as to cause fluid to flow along the walls 42 or 43 of the plate means 14.

*Operation*

The operation of the present unit can best be understood by taking specific examples. If a fluid is introduced into the inlet pipe 20 and it fills the manifold chamber 21, the outlets 22 and 23 of the manifold 21 will be filled with fluid and the fluid will flow through the amplifier sections 24 and 25. With no signal applied to the control ports 34, 35, 36, or 37, the fluid flowing through the amplifier sections 24 and 25 merely flows straight into the outlet chamber 30 and is distributed in the three outlet pipes 31, 32 and 33. If a control signal is applied to the ports 34 and 35 which cause the fluid flow from amplifier section 24 to attach to wall 40, the entire output of the fluid amplifier section 24 flows into the pipe 31. Similarly if the control signal to the ports 34 and 35 causes the flow from amplifier section 24 to attach to wall 41, the output of the fluid amplifier section 24 would flow into pipe 33.

The same arrangement applies to the fluid amplifier section 25. By switching the fluid amplifier section 25 so that the flow attaches to wall 42, the fluid flowing through the amplifier section 25 passes out of pipe 31. If the signal applied to ports 36 and 37 causes the fluid to flow downward and attaches to wall 43, the fluid outlet is through pipe 33. It is thus apparent that it is possible to get the fluid amplifier sections 24 and 25 to simultaneously cause their respective fluids to flow out of pipes 31 and 33 at the same time or to cause the flows to follow along the inner walls 41 or 42 to combine in the outlet chamber 30. If the flows follow walls 41 and 42 to combine in the chamber 30, substantially all of the fluid flow exits through pipe 32. If the combination of control signals is applied to cause the fluid flow to attach to walls 41 and 43 all of the fluid will flow out of the pipe 33. Likewise, if the control signals are applied to cause all of the fluid to attach to walls 42 and 40 the total flow is out of pipe 31.

It can thus be seen that by switching the two fluid flows between their two possible fluid flow paths, that it is possible to cause all of the fluid to flow out of any one of the three pipes or to split equally and to flow out of the pipes 30 and 31. With this arrangement it is possible to obtain a step form of proportioning or modulation. It is further possible by causing the control signals to switch rapidly at the inlet control pipes 16 through 19 to cause a continuous mixing of the fluid that is introduced into the manifold chamber. It will thus be apparent that either of two possible uses can be made of the present device, that is, to obtain step modulation or to use the device as a mixing unit for combining or intermixing a fluid that is introduced into pipe 20.

In FIGURE 4 there is disclosed a top schematic view of fluid amplifier means that utilizes five fluid amplifier sections. The fluid amplifier sections 50, 51, 52, 53, and 54 each open into a manifold chamber 21 that has an inlet pipe 20. Each of the amplifier sections 50 through 54 is provided with a pair of control ports as shown in FIGURE 2. For clarity's sake it is not considered necessary to describe in detail the construction of FIGURE 4, as its structure follows that of FIGURE 2 and the arrangement in FIGURE 4 is primarily schematic in nature. It will thus be appreciated again that an outlet chamber 30 is provided having outlet pipes 31, 32, and 33. The outlet pipes again are laminated between clear plastic members 11 and 12 and therein a fluid tight arrangement is provided with plate means 14'.

The operation of FIGURE 4 is substantially the same as that of FIGURE 2 in that one or more of the fluid amplifier sections 50 through 54 can be switched either upward or downward as disclosed in FIGURE 4. By switching all of the fluid amplifier sections 50 through 54 in an upward direction, the total flow is out of pipe 31. If the fluid amplifier sections 50 through 54 are switched in a downward direction, the total output flow is into pipe 33. Any variation in switching so that the fluid amplifiers sections 50 through 54 are not all switched in the same direction causes a split of flow between the pipes 31, 32, and 33 so as to obtain a step modulation or split of flow between the pipes. It is believed that the operation of FIGURE 4 is evident from the detailed description of operation supplied in connection with FIGURE 2. FIGURE 4 has been disclosed schematically merely to show one of the many possibilities for obtaining finer degrees of modulation or to show how more thorough mixing could be obtained of a fluid passing into pipe 20 before it leaves the fluid amplifier means.

In FIGURE 5 a further modification of the present invention is shown. The modification is of the device disclosed in FIGURES 1 through 3 but it is a modification that could be applied to FIGURE 4, as well, as will become apparent from a discussion of FIGURE 5. The inlet manifold 21 of FIGURE 2 is split into two manifold inlets 21' by a wall 45 so that two separate inlets are provided to the fluid amplifier device. The constructional details in FIGURE 5 follow the same constructional details as FIGURE 2, and only a portion of the device is shown. Two separate inlet pipes 46 and 47 are provided so that the inlet pipe 46 supplies fluid to the manifold outlet 22 while the inlet pipe 47 provides fluid to the manifold outlet 23.

The separation of the manifold chamber 21 into two manifold chambers 21' makes use of the two independent inlets to the fluid amplifier means to supply two divided fluids that are mixed in a single outlet chamber 30. The object of supplying two separate and distinct fluids can be readily understood if the device is considered as constantly supplied with a fluid through pipe 46 and intermittently supplied with a fluid through 47. It thus becomes apparent that the amplifier device 10 can be operated constantly at one level with intermittant admission of a secondary fluid to either change a mixture content or to change a flow pattern in the outlet chamber 30 into the outlet pipes 31, 32, or 33.

It is obvious further than FIGURE 4 could be modified so that each of the fluid amplifier sections 50 through 54 could be individually supplied with fluid as opposed to being supplied from a single manifold chamber.

The present invention utilizes a fluid amplifier concept wherein no moving parts are used to cause a fluid flow to change direction. The fluid amplifiers per se are not material to the present invention and any one of the various types of fluid amplifiers previously described and discussed could be used. The present invention is directed to the concept of utilizing a single manifold or inlet to a plurality of amplifier sections so that the group of amplifier sections can control a single fluid inlet between one or more fluid outlets. It will be obvious from considering the present description in connection with FIGURES 1 to 5 that many variations of the invention are possible. As such the applicant wishes to be limited in no way to the specific disclosure of FIGURES 1 to 5, but wishes to be limited only in the scope of the appended claims.

I claim as my invention:

1. In a fluid amplifier means for control of a fluid flow comprising: a fluid manifold chamber having inlet means supplied with said fluid and said chamber having a plurality of outlets; a plurality of fluid amplifier sections each having an inlet connected to a separate outlet of said manifold chamber; control port means for each of said fluid amplifier sections for application of a control signal to switch each said fluid amplifier section independently of every other fluid amplifier section; outlet chamber means commonly receiving all of the fluid flow from said amplifier sections; and said outlet chamber means having a plurality of outlets to selectively carry off said fluid flow.

2. In a fluid amplifier means for control of a fluid flow comprising: a fluid manifold chamber having inlet means supplied with said fluid and said chamber having a plurality of outlets; a plurality of fluid amplifier sections each having an inlet connected to a separate outlet of said manifold chamber; control port means for each of said fluid amplifier sections for application of a control signal to create a pressure differential across each of said amplifier sections to switch each said fluid amplifier section independently of every other fluid amplifier section; outlet chamber means commonly receiving all of the fluid flow from said amplifier sections; and said outlet chamber means having a plurality of outlets to selectively carry off said fluid flow.

3. In a fluid amplifier means for control of a fluid flow comprising: a fluid manifold chamber having an inlet supplied with said fluid and said chamber having a plurality of outlets; a plurality of fluid amplifier sections each having an inlet connected to a separate outlet of said manifold chamber; a pair of control ports for each of said fluid amplifier sections for application of a control pressure to switch each said fluid amplifier section independently of every other fluid amplifier section; an outlet chamber commonly receiving all of the fluid flow from said amplifier sections; and said outlet chamber means having three outlet pipes to selectively carry off said fluid flow; said amplifier sections responding to said control pressures to switch said fluid flow into said outlet chamber to at least one of said three outlet pipes.

4. In a proportioning fluid amplifier means for proportional control of a fluid flow comprising: a fluid manifold chamber having inlet means supplied with said fluid and said chamber having a plurality of outlets; a plurality of fluid amplifier sections each having an inlet connected to a separate outlet of said manifold chamber; control port means for each of said fluid amplifier sections for application of a control signal to switch each said fluid amplifier section independently of every other fluid amplifier section; outlet chamber means commonly receiving all of the fluid flow from said amplifier sections; said control signal causing each of said fluid amplifier sections to direct part of said total fluid flow into independent streams; and said outlet chamber means having three outlet pipes to selectively carry off said streams; said control signal switching said streams into one or more of said pipes to obtain said proportional control of said fluid flow.

5. In a fluid amplifier means for control of a fluid flow comprising: a fluid manifold chamber having inlet means supplied with said fluid and said chamber having only two outlets; only two fluid amplifier sections each having an inlet connected to a separate one of said outlets; control port means for each of said fluid amplifier sections for application of a control signal to switch each of said fluid amplifier sections independently of the other fluid amplifier section; outlet chamber means commonly receiving all of the fluid flow from said amplifier sections; and said outlet chamber means having a plurality of outlets to selectively carry off said fluid flow.

6. In a fluid amplifier means for control of a fluid flow comprising: a fluid manifold chamber having an inlet supplied with said fluid and said chamber having only two outlets; only two fluid amplifier sections each having an inlet connected to a separate one of said outlets; a pair of control ports for each of said fluid amplifier sections for application of a control pressure to switch each of said fluid amplifier sections independently of the other fluid amplifier section; an outlet chamber receiving all of the fluid flow from said amplifier sections; and said outlet chamber having only three outlet pipes to selectively carry off said fluid flow; said amplifier sections responding to said control pressures to switch said fluid flow into said outlet chamber to at least one of said three outlet pipes.

7. In a fluid amplifier means for control of a fluid flow comprising: fluid inlet means supplied with said fluid and said inlet means having a plurality of outlets; a plurality of fluid amplifier sections each having an inlet connected to a separate outlet of said inlet means; control port means for each of said fluid amplifier sections for application of a control signal to switch said fluid amplifier section independent of every other fluid amplifier section; outlet chamber means commonly receiving all of the fluid flow from said amplifier sections, and said outlet chamber means having a plurality of outlets to selectively carry off said fluid flow.

8. In a fluid amplifier means for control of a fluid flow comprising: fluid inlet means supplied with said fluid and said means having a plurality of outlets; a plurality of fluid amplifier sections each having an inlet connected to a separate outlet of said inlet means; a pair of control ports for each of said fluid amplifier sections for application of a control pressure to switch each said fluid amplifier section independently of every other fluid amplifier section; an outlet chamber commonly receiving all of the fluid flow from said amplifier sections; and said outlet chamber means having three outlet pipes to selectively carry off said fluid flow; said amplifier sections responding to said control pressures to switch said fluid flow into said outlet chamber to at least one of said three outlet pipes.

9. In a fluid amplifier means for control of a fluid flow comprising: fluid inlet means supplied with said fluid and said means having only two outlets; only two fluid amplifier sections each having an inlet connected to a separate one of said outlets; control port means for each of said fluid amplifier sections for application of a control signal to switch each of said fluid amplifier sections independently of the other amplifier section; outlet chamber means commonly receiving all of the fluid flow from said amplifier sections; and said outlet chamber means having a plurality of outlets to selectively carry off said fluid flow.

No references cited.